(No Model.)

C. BAAR.
GROOVING SAW.

No. 552,573. Patented Jan. 7, 1896.

Witnesses
Lewis E. Flanders
Lois Moulton

Inventor
Charles Baar
By Attorney
Luther V. Moulton

UNITED STATES PATENT OFFICE.

CHARLES BAAR, OF GRAND RAPIDS, MICHIGAN.

GROOVING-SAW.

SPECIFICATION forming part of Letters Patent No. 552,573, dated January 7, 1896.

Application filed March 18, 1895. Serial No. 542,150. (No model.)

*To all whom it may concern:*

Be it known that I, CHARLES BAAR, a citizen of the United States, residing at Grand Rapids, in the county of Kent and State of Michigan, have invented certain new and useful Improvements in Grooving-Saws; and I do hereby declare the following to be a full, clear, and exact description of the invention, such as will enable others skilled in the art to which it appertains to make and use the same.

This invention relates to that type of saws formed with segments which are bent or twisted from the plane of the flat central part; and it consists in the peculiar construction thereof herein shown and described.

The object of the invention is to produce a grooving-saw of a given diameter capable of cutting grooves wider than heretofore deemed possible with saws of such diameter, and of simple, cheap and durable construction.

Figure 1:
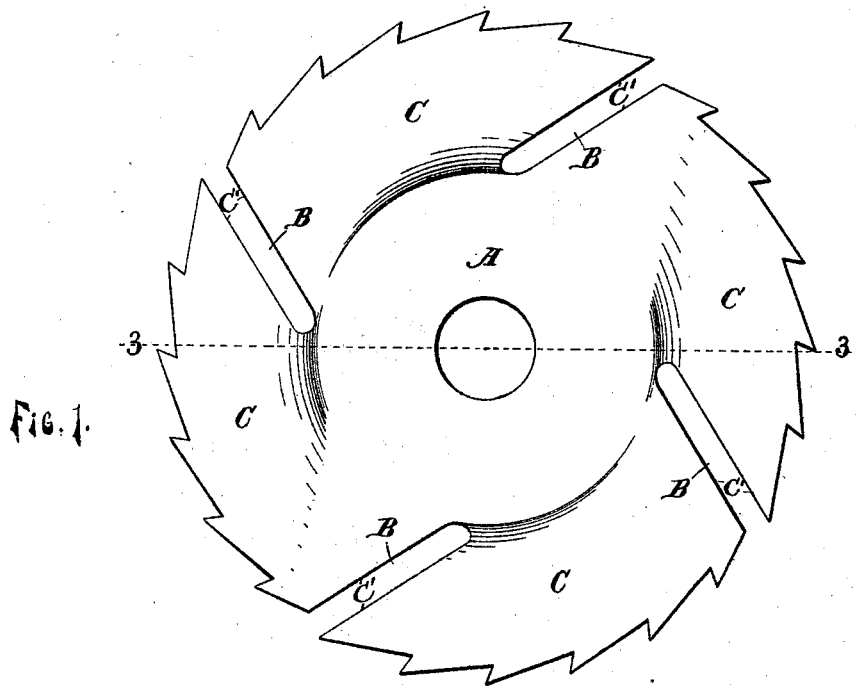
Figure 2:
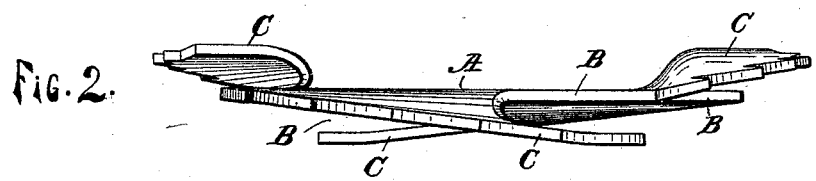
Figure 3:
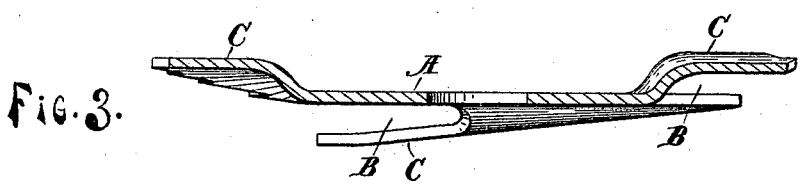

In the accompanying drawings, illustrating the invention, Figure 1 is a side view of a saw constructed in accordance with my invention. Fig. 2 is an edge view of the same, and Fig. 3 is a section on the line 3 3 of Fig. 1.

A designates the flat central portion of the saw, which is common to saws of this character, and B designates the series of deep slits or openings which extend inward from the periphery of the saw to said flat central portion and divide said periphery into a plurality of segments C, which are detached from each other at their adjacent ends C', and each of which is formed with a series of cutting-teeth. These segments C are twisted or turned so that their outer edges will lie in planes inclined to the plane of the central portion A, and in order to increase the width of the groove cut the segments may be turned alternately toward opposite sides.

It will be seen that by forming the body of the saw with deep slits or openings between the segments the latter may be twisted or turned without drawing or elongating the metal of the periphery of the saw.

Experience has proved that a saw constructed as above set forth can be made to cut wider grooves than is possible to make those heretofore proposed, diameter for diameter.

Having thus described my invention, what I claim is—

1. A circular grooving saw, having a flat central portion and a series of deep openings extending from its periphery to said central portion thereby forming toothed segments, detached from each other at their adjacent ends, said segments being turned or twisted out of the plane of the central portion of the saw, substantially as described.

2. A circular grooving saw, having a flat central portion and a series of openings extending from its periphery to said central portion and forming segments detached from each other at their adjacent ends, each of said segments being formed with a series of cutting teeth and said segments being turned or twisted alternately in opposite direction, substantially as described.

In testimony whereof I affix my signature in presence of two witnesses.

CHAS. BAAR.

Witnesses:
 LOIS MOULTON,
 LEWIS E. FLANDERS.